2,746,977

METHOD OF PRECIPITATING 3,12-DIHYDROXY-7-KETOCHOLANIC ACID AND ADDITION COMPOUND THEREOF

Robert H. Sifferd and Jerry J. Svarz, Joliet, Ill., assignors to Armour and Company, Chicago, Ill., a corporation of Illinois No Drawing. Application October 2, 1953,
Serial No. 383,919

7 Claims. (Cl. 260—397.1)

This invention relates to a method of precipitating 3, 12-dihydroxy-7-ketocholanic acid and an addition compound thereof. The method and addition compound of this invention have particular utility in separating the 7-keto derivative (3,12-dihydroxy - 7 - ketocholanic acid) from other keto derivatives of cholic acid.

Desoxycholic acid is important as a starting material for the synthesis of cortisone. The principal source of this acid is bile, which also contains cholic acid and other bile acids. Usually, bile contains about three times as much cholic as desoxycholic acid, which makes it desirable to convert at least part of the cholic acid into desoxycholic acid to increase the yield of the latter material. This conversion is now being carried out on a commercial basis by various oxidation-reduction procedures.

The usual practice in converting cholic to desoxycholic acid is to first separate the desoxycholic acid from the cholic acid with which it is associated in natural bile. The cholic acid is then subjected to oxidation. Such oxidation procedures as practiced commercially usually result in the production of a mixture of keto derivatives of cholic acid, with the 7-keto derivative predominating. Various oxidizing agents can be used for this purpose with more or less success, such as chromic acid or oxide in dilute acetic acid, potassium dichromate in dilute mineral acid, potassium permanganate in an aqueous solution of acetic acid, a mixture of bromine and a bicarbonate, etc. One of the newer oxidizing agents which displays the desired type of selectivity is N-bromosuccinimide. However, as indicated previously, the usual end result of the oxidation is the production of a mixture of keto derivatives of cholic acid with the 7-keto derivative probably predominating. The mixture of reaction products will also usually contain some unreacted cholic acid, which it would be desirable to recover for further oxidation, as well as other useful and valuable derivatives which it would be desirable to recover, such as dehydrocholic acid (3,7,12-triketocholanic acid).

The present commercial practice for the completing of the conversion of cholic to desoxycholic acid defeats the desire to recover the other constituents of the mixture obtained by the oxidation step. In this practice the mixture is subjected to a reduction procedure to reduce the 7-keto group of the desired derivatives to a methylene group. Usually, a Wolff-Kishner-type reduction is employed, followed by the isolation of the resulting desoxycholic acid. This reaction procedure destroys the value of the other components of the intermediate reaction mixture due to degradation and decomposition. This is particularly unfortunate, as indicated, in regard to the cholic acid which remained unreacted at the end of the oxidation step and to the dehydrocholic acid which was produced by the oxidation step. Further, because of the other constituents which are carried through the entire process until the final separation of the desoxycholic acid, there tends to be a reduction in the yield and quality of the desoxycholic acid obtained.

It has been suggested that some of the above described difficulties might be avoided by extracting the keto derivatives into ethyl acetate, concentrating the extracted material to a dry solid, redissolving the solid material in ethyl acetate, and adding diethylene glycol to precipitate the 7-keto derivative. The precipitated diethylene glycol adduct of the 7-keto derivative presumably would be separated from the supernatant containing the other keto derivatives, and then subjected to a Wolff-Kishner-type reduction to produce desoxycholic acid.

The alternative process just described, however, is not well adapted for commercial operations. Difficulty is experienced in carrying out the precipitation of the 7-keto derivative, since the diethylene glycol addition compound thereof is relatively soluble in ethyl acetate, especially in the presence of water. This is undoubtedly the reason for the proposed step of completely drying the extracted material to form a dry solid which is then redissolved in ethyl acetate. Otherwise, it would be difficult to avoid having some water present during the precipitation since the solubility of water and ethyl acetate is quite high, and large amounts of water will be picked up by the ethyl acetate phase during the extraction of the keto derivatives from the aqueous reaction mixture. For these and other reasons, it has been found to be difficult to make a clean separation of the 7-keto derivative from the other keto derivatives so as to obtain high yields of the desired product.

It is, therefore, a general object of this invention to provide an improved method for separating the 7-keto derivative of cholic acid immediately after the oxidation step so that it can be further processed alone, while at the same time permitting the other valuable constituents of the intermediate reaction mixture to be recovered, such as the unreacted cholic acid, the other keto derivatives, and the dehydrocholic acid. A more specific object of this invention is to provide a process of the character described which permits the 7-keto derivative to be separated from the other keto derivatives in high yields and with a reduced number of processing steps. Further objects and advantages will appear as the specification proceeds.

This invention is based in part upon the discovery that 3,12-dihydroxy-7-ketocholanic acid forms an addition compound with glycerol which is very insoluble in ethyl acetate even in the presence of water. This addition compound is believed to be composed of one molecule of glycerol to two molecules of the 7-keto acid. Further, it has been found that the glycerol displays a selective action in only forming an addition compound with the 7-keto derivative of cholic acid, and that no significant combination occurs with the other keto derivatives.

One preferred method of practicing this invention is to extract the keto derivatives into ethyl acetate. This can readily be accomplished by adding ethyl acetate to the aqueous reaction mixture containing the keto derivatives to form an ethyl acetate-rich phase and a water-rich phase. The keto derivatives are then extracted into the ethyl acetate-rich phase, which is then separated from the water-rich phase. Glycerol can then be added directly to the separated ethyl acetate phase to precipitate the 7-keto derivative as its addition compound with the glycerol. However, it may be desirable to first reduce the amount of water present in the ethyl acetate. This can be accomplished by subjecting the separated ethyl acetate phase to vacuum distillation to remove most of the water therefrom while maintaining the keto derivatives in solution. It has been found that it is not necessary to have the ethyl acetate completely anhydrous, as indicated above, since the glycerol addition compound of the 7-keto derivative is quite insoluble in the ethyl acetate even though some water is present. Usually, however, it will be preferred to reduce the water present to less than about 1%.

Another method by means of which good results can be obtained is to use methyl isobutyl ketone instead of the ethyl acetate, that is, the keto derivatives are extracted into methyl isobutyl ketone in the same manner as that previously described when ethyl acetate was employed. Methyl isobutyl ketone has the advantage of not being subject to hydrolysis. Also, it is desirable to take advantage of the fact that the keto derivatives are quite soluble in methyl isobutyl ketone while water is of very limited solubility therein. In other words, the keto derivatives can be extracted from the aqueous reaction mixture and obtained in an organic solvent phase of low water content. Here again, however, it may be desired to dehydrate the ketone phase containing the keto derivatives before adding the glycerol thereto. This can be done in the same manner as that previously described for the ethyl acetate extract.

The amount of glycerol employed in the processes just described is not critical, except that sufficient glycerol should be added to precipitate substantially all of the 7-keto derivative, that is, at least two moles of glycerol should be added for each mole of the 7-keto derivative. Approximate amount of glycerol to be added can be gauged by adding it slowly or incrementally while agitating the mixture until no further precipitate forms on the addition of more glycerol. While temperature and pH conditions have not been found to be particularly critical, it is preferred to carry out the precipitation steps at temperatures ranging from about 50° C. to 80° C.

The crystalline precipitate, comprising the addition compound of glycerol and 3,12-dihydroxy-7-ketocholanic acid, which is obtained by either of the embodiments of this invention just described, can be readily separated from the mother liquor by centrifugation or filtration. The separated 7-keto derivative can then be further processed to prepare desoxycholic acid. For example, this can be done by the procedure described in Patent No. 2,471,697. We prefer, however, to employ the procedure described in Robert H. Sifferd co-pending application, Serial No. 382,215, filed September 24, 1953, for Method of Reducing Steroid Ketones.

The mother liquor remaining after the separation of the 7-keto derivative will usually contain substantial quantities of other keto derivatives. These keto derivatives can then be subjected to a further oxidation to convert them to dehydrocholic acid, as described in our co-pending application, Serial No. 383,920, filed October 2, 1953, for Method of Preparing Oxidized Derivatives of Cholic Acid.

This invention is further illustrated by the following specific examples:

*Example I*

One liter of aqueous alkaline solution containing 130 grams of partially oxidized cholic acid, as the sodium salt, is acidified to pH 4.0 in the presence of 500 cc. methyl isobutyl ketone, the lower aqueous phase drawn off and discarded, the supernatant solvent phase washed with water and dehydrated by azeotropic distillation. The solution is brought to 600 cc. total volume with additional methyl isobutyl ketone and cooled to 80° C. 30 cc. of glycerol are added with vigorous agitation and the mixture cooled to room temperature, the crystalline glycerol product of 7-keto 3,12-dihydroxycholanic acid separated by filtration and washed with fresh methyl isobutyl ketone. The product is dried, yielding 90 grams of said addition product, which can then be reduced, if desired, by conventional procedures to desoxycholic acid.

*Example II*

The process was carried out as described in Example I except that ethyl acetate was employed in place of methyl isobutyl ketone. Comparable results were obtained.

While in the foregoing specification this invention has been described in relation to particular embodiments thereof and specific details have been set forth for the purpose of illustration, it will be apparent to those skilled in the art that it is susceptible to other embodiments and that many of the specific details set forth can be varied widely without departing from the spirit of the invention.

We claim:

1. In a process for preparing desoxycholic acid wherein an aqueous solution containing a mixture of 3,12-dihydroxy-7-ketocholanic acid with other keto derivatives of cholic acid is obtained, the method of separating 3,12-dihydroxy-7-ketocholanic acid characterized by the steps of extracting said keto derivatives from said aqueous solution thereof into ethyl acetate, adding glycerol to the ketone extract, precipitating an addition compound of glycerol and 3,12-dihydroxy-7-ketocholanic acid, and separating the addition compound from the mother liquor containing the other keto derivatives.

2. In a process for preparing desoxycholic acid wherein an aqueous solution containing a mixture of 3,12-dihydroxy-7-ketocholanic acid with other keto derivatives of cholic acid is obtained, the method of separating 3,12-dihydroxy-7-ketocholanic acid characterized by the steps of adding ethyl acetate to said aqueous solution to form an ethyl acetate phase and a water phase, extracting 3,12-dihydroxy-7-ketocholanic acid into the ethyl acetate phase together with the other keto derivatives, separating the ethyl acetate phase from the water phase, removing substantially all of the water from the separated ethyl acetate phase while maintaining the keto derivatives in solution therein, and adding glycerol to the substantially water-free ethyl acetate phase to form as a precipitate an addition compound of glycerol and 3,12-dihydroxy-7-ketocholanic acid.

3. In a process for preparing desoxycholic acid wherein an aqueous solution containing a mixture of 3,12-dihydroxy-7-ketocholanic acid with other keto derivatives of cholic acid is obtained, the method of separating 3,12-dihydroxy-7-ketocholanic acid characterized by the steps of extracting said keto derivatives from said aqueous solution thereof into an organic solvent selected from the group consisting of ethyl acetate and methyl isobutyl ketone, adding glycerol to the organic solvent extract, precipitating an addition compound of glycerol and 3,12-dihydroxy-7-ketocholanic acid, and separating the addition compound from the mother liquor containing the other keto derivatives.

4. In a process for preparing desoxycholic acid wherein an aqueous solution containing a mixture of 3,12-dihydroxy-7-ketocholanic acid with other keto derivatives of cholic acid is obtained, the method of separating 3,12-dihydroxy-7-ketocholanic acid characterized by the steps of adding methyl isobutyl ketone to said aqueous solution to form a ketone phase and a water phase, extracting 3,12-dihydroxy-7-ketocholanic acid into the ketone phase together with the other keto derivatives, separating the ketone phase from the water phase, removing substantially all of the water from the separated ketone phase while maintaining the keto derivatives in solution therein, and adding glycerol to the substantially water-free ketone phase to form as a precipitate an addition compound of glycerol and 3,12-dihydroxy-7-ketocholanic acid.

5. The method of selectively precipitating 3,12-dihydroxy-7-ketocholanic acid, comprising dissolving a mixture of keto derivatives of cholic acid in an organic solvent, said mixture including a substantial amount of 3,12-dihydroxy-7-ketocholanic acid and at least one other keto derivative of cholic acid, said organic solvent being selected from the group consisting of ethyl acetate and methyl isobutyl ketone, adding glycerol to the solution thus formed, precipitating an addition compound of glycerol and 3,12-dihydroxy-7-ketocholanic acid, and separating the addition compound from the mother liquor containing the other keto derivatives.

6. The method of recovering 3,12-dihydroxy-7-ketocholanic acid from a solution thereof in a solvent selected from the group consisting of ethyl acetate and methyl isobutyl ketone, said solution containing at least one other keto derivative of cholic acid, comprising adding a sufficient quantity of glycerol to said solution to form an addition compound with substantially all of said acid therein, precipitating the addition compound of said glycerol and said acid, and separating the precipitated addition compound from the remaining supernatant.

7. The method of recovering 3,12-dihydroxy-7-ketocholanic acid from a solution thereof in aqueous ethyl acetate which also contains at least one other keto derivative of cholic acid, comprising adding a sufficient quantity of glycerol to said solution to form an addition compound with substantially all of said acid therein, precipitating the addition compound thus formed, and separating the precipitated addition compound from the ethyl acetate supernatant.

References Cited in the file of this patent

UNITED STATES PATENTS

| | | |
|---|---|---|
| 2,360,447 | Schmidt | Oct. 17, 1944 |
| 2,374,680 | Hoehn | May 1, 1945 |
| 2,549,947 | Tullar | Apr. 24, 1951 |